US010958735B2

(12) United States Patent
Shang (10) Patent No.: US 10,958,735 B2
(45) Date of Patent: Mar. 23, 2021

(54) CLIENT CONNECTION METHOD AND SYSTEM (71) Applicant: TENCENT TECHNOLOGY (SHENZHEN) COMPANY LIMITED, Shenzhen (CN)

(72) Inventor: Zifeng Shang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 16/031,589

(22) Filed: Jul. 10, 2018

(65) Prior Publication Data

US 2018/0324259 A1 Nov. 8, 2018

Related U.S. Application Data (63) Continuation of application No. PCT/CN2017/079727, filed on Apr. 7, 2017.

(30) Foreign Application Priority Data

Apr. 8, 2016 (CN) .......................... 201610216514.X (51) Int. Cl.
G06F 15/16 (2006.01)
H04L 29/08 (2006.01)
(Continued)

(52) U.S. Cl.
CPC .......... *H04L 67/141* (2013.01); *H04L 9/3213* (2013.01); *H04L 9/3228* (2013.01);
(Continued)

(58) Field of Classification Search
CPC ..... H04L 67/141; H04L 9/3213; Y10S 379/91
See application file for complete search history.

(56) References Cited

U.S. PATENT DOCUMENTS 7,419,097 B2 * 9/2008 Lee .................... G06K 7/10722
235/462.11
7,748,630 B2 * 7/2010 Lee ...................... G06Q 20/322
235/462.11
(Continued)

FOREIGN PATENT DOCUMENTS

CN 101127784 A 2/2008
CN 101312453 A 11/2008
(Continued)

OTHER PUBLICATIONS

The World Intellectual Property Organization (WIPO) International Search Report for PCT/CN2017/079727 dated Jun. 26, 2017 5 Pages (including translation).

(Continued)

*Primary Examiner* — Douglas B Blair
(74) *Attorney, Agent, or Firm* — Anova Law Group, PLLC (57) ABSTRACT A client connection method is provided. The method includes obtaining, by a second client, a first link from a first sharing identifier of a first client. The first link includes a first identification code and service type information, the first identification code is used for identifying the first client, and the service type information represents a service type corresponding to a client connection server. The second client extracts the first identification code and the service type information according to the first link, determines the client connection server according to the service type information, and sends a connection request carrying the first identification code and a second identification code to the client connection server. The second client connects with the first client based on a binding connection between the first client and the second client established by the client connection server.

19 Claims, 5 Drawing Sheets (51) Int. Cl.
*H04L 9/32* (2006.01)
*H04L 29/06* (2006.01)
(52) U.S. Cl.
CPC .......... *H04L 63/0876* (2013.01); *H04L 67/28* (2013.01); *H04L 67/02* (2013.01)

(56) References Cited

U.S. PATENT DOCUMENTS

| | | | | |
|---|---|---|---|---|
| 10,661,165 | B2* | 5/2020 | Heppe | A63F 13/27 |
| 2006/0149854 | A1* | 7/2006 | Rudkin | H04Q 3/665 |
| | | | | 709/241 |
| 2007/0230374 | A1* | 10/2007 | Altberg | H04L 63/0428 |
| | | | | 370/271 |
| 2007/0250450 | A1* | 10/2007 | Ramlau-Hansen | G06Q 20/32 |
| | | | | 705/64 |
| 2008/0253363 | A1* | 10/2008 | Altberg | G09B 5/125 |
| | | | | 370/352 |
| 2009/0106408 | A1* | 4/2009 | Yoshizawa | G06Q 10/10 |
| | | | | 709/223 |
| 2012/0134302 | A1* | 5/2012 | Yang | H04L 12/1822 |
| | | | | 370/261 |
| 2012/0297423 | A1* | 11/2012 | Kanojia | H04N 21/6581 |
| | | | | 725/48 |
| 2015/0244812 | A1 | 8/2015 | Brunson et al. | |
| 2016/0119478 | A1* | 4/2016 | Sharpe | H04M 3/5191 |
| | | | | 379/265.09 |
| 2016/0321628 | A1 | 11/2016 | Xu | |
| 2017/0142170 | A1* | 5/2017 | Sylvain | H04L 65/1083 |
| 2017/0163696 | A1* | 6/2017 | Inoue | H04L 65/403 |
| 2017/0223004 | A1* | 8/2017 | Guan | G06K 7/1417 |

FOREIGN PATENT DOCUMENTS

| | | |
|---|---|---|
| CN | 102611753 A | 7/2012 |
| CN | 102868696 A | 1/2013 |
| CN | 104169952 A | 11/2014 |
| CN | 104426962 A | 3/2015 |
| CN | 104519414 A | 4/2015 |
| CN | 104519485 A | 4/2015 |
| CN | 105530222 A | 4/2016 |
| CN | 105897888 A | 8/2016 |
| EP | 2790387 A1 | 10/2014 |
| EP | 2863607 A2 | 4/2015 |
| WO | 2015027823 A1 | 3/2015 |

OTHER PUBLICATIONS

The State Intellectual Property Office of the People's Republic of China (SIPO) Office Action 1 for 021610216514.X Oct. 15, 2019 10 Pages (including translation).

Indian Patent Office Examination report for Application No. 201847016413 dated Jul. 17, 2020 6 pages.

* cited by examiner

| S101: A first client determines a shared identifier according to a link for binding of a client, where the link includes a first identification code of the first client and service type information, the first identification code is used for identifying the first client, the service type information represents a service type, and there is a correspondence between the service type information and a client connection server

↓

S102: A second client obtains the link from the shared identifier, obtains the first identification code and the service type information according to the link, determines the client connection server according to the service type information, and sends a connection request carrying the first identification code and a second identification code to the client connection server, where the second identification code is used for identifying the second client

↓

S103: The client connection server obtains the first identification code and the second identification code from the connection request, and establishes a binding connection between the first client and the second client according to the first identification code and the second identification code

↓

S104: The second client receives a binding success response returned by the client connection server, and adds a name of the first client to a second client binding list of the second client

↓

S105: The first client receives real-time binding change information fed back by the client connection server, where the information includes a name of the second client and the second identification code, and adds the name of the second client to a first client binding list of the first client

A client connection server receives a connection request sent by a second client, where the connection request includes a first identification code and a second identification code, the first identification code is used for identifying a first client, the second identification code is used for identifying the second client, the connection request is determined by the second client according to a shared identifier of the first client, the first client determines the shared identifier according to a link for binding of a client, the link includes the first identification code and service type information, the service type information represents a service type, there is a correspondence between the service type information and the client connection server, and the second client obtains the link from the shared identifier, obtains the first identification code and the service type information according to the link, and determines the client connection server according to the service type information ⎯ S501

↓

The client connection server establishes a binding connection between the first client and the second client according to the first identification code and the second identification code in the connection request ⎯ S502

FIG. 5

CLIENT CONNECTION METHOD AND SYSTEM

RELATED APPLICATION

This application is a continuation application of PCT Patent Application No. PCT/CN2017/079727, filed on Apr. 7, 2017, which claims priority to Chinese Patent Application No. 201610216514.X, filed with the Chinese Patent Office on Apr. 8, 2016, and entitled "CLIENT CONNECTION METHOD AND SYSTEM", the entire contents of all of which are incorporated herein by reference.

FIELD OF THE TECHNOLOGY

The present disclosure relates to the field of Internet, and in particular, to a client connection method and system.

BACKGROUND OF THE DISCLOSURE

In the existing technology, clients establish a binding relationship to each other by logging in to a same account number. Any client may obtain, from a server, information about another client under a current account number. Such information may uniquely identify a client, and then information or a command is sent to the client.

To establish a connection between two clients, the two clients need to log in to a same account number. Costs of such an operation are very high, resulting in poor user experience and low function utilization.

SUMMARY

In view of this, embodiments of the present disclosure provide a client connection method and system.

A client connection method is provided. The method includes obtaining, by a second client, a first link from a sharing identifier of a first client. The first link includes a first identification code and service type information, the first identification code is used for identifying the first client, and the service type information represents a service type corresponding to a client connection server. The second client extracts the first identification code and the service type information according to the first link, determines the client connection server according to the service type information, and sends a connection request carrying the first identification code and a second identification code to the client connection server. The second client connects with the first client based on a binding connection between the first client and the second client established by the client connection server according to the first identification code and the second identification code.

A client connection system is provided, the system including a first client, a second client, and a client connection server. The first client is configured to determine a sharing identifier according to a link for binding of a client, the link including a first identification code of the first client and service type information, the service type information representing a service type corresponding to the client connection server. The second client IS configured to: obtain the link from the sharing identifier, obtain the first identification code and the service type information according to the link, determine the client connection server according to the service type information, and send a connection request carrying the first identification code and a second identification code to the client connection server, the second identification code being used for identifying the second client. The client connection server is configured to: obtain the first identification code and the second identification code from the connection request, and establish a binding connection between the first client and the second client according to the first identification code and the second identification code, the first identification code and the second identification code being both unique.

A non-transitory computer-readable medium is provided. The storage medium stores computer-executable program that, when being executed by a processor, causes the processor to perform obtaining, by a second client, a first link from a first sharing identifier of a first client. The first link includes a first identification code and service type information, the first identification code is used for identifying the first client, and the service type information represents a service type corresponding to a client connection server. The computer-executable program further causes the processor to perform: extracting, by the second client, the first identification code and the service type information according to the first link; determining, by the second client, the client connection server according to the service type information; sending, by the second client, a connection request carrying the first identification code and a second identification code to the client connection server, the second identification code being used for identifying the second client; and connecting with the first client based on a binding connection between the first client and the second client established by the client connection server according to the first identification code and the second identification code.

BRIEF DESCRIPTION OF THE DRAWINGS

FIG. 1 is a flowchart of an embodiment of a client connection method according to the embodiments of the present disclosure;

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and the like are intended to distinguish between similar objects rather than describe a specific order. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Nouns to be used are described first.

Thread: sometimes referred to as a light weight process (LWP), is the smallest unit of a program execution flow. A tread may create or cancel another thread, and multiple threads in a same process may be concurrently executed. Because of mutual constraints between threads, thread discontinuity occurs when the threads are running. Therefore, a thread has three basic states: ready, blocked, and running.

Uin: is a current user identity state of a browser, that is, an account number that a user logs in to in a browser.

GUID: a globally unique identifier (GUID), is a numeric identifier with a binary length of 128 bits that is generated according to an algorithm, and may be used for any computer or network that needs a unique identifier.

Hypertext Transfer Protocol (HTTP): is a data transfer protocol in which a rule of communication between a browser and a World Wide Web (WWW) server is specified in detail, and a WWW file is transferred through the Internet.

Two-dimensional code: a two-dimensional barcode/two-dimensional code (2-dimensional bar code) records data symbol information by using black and white graphs distributed on a plane (in a two-dimensional direction) according to a specific rule by using a specific geometric figure. In code compiling, a concept of a bit stream "0" or "1" that serves as a basis of internal logic of a computer is dexterously used, several geometric figures corresponding to a binary system are used to indicate character value information, and an image input device or an optoelectronic scanning device automatically recognizes and reads such information to implement automatic information processing. This has some similarities of a barcode technology: each code style has its specific character set; each character occupies a certain width; and there is a certain check function, and the like.

Client: a client (Client) or a user side, refers to a program corresponding to a server and providing a local service for a customer. Such program, except some application programs running locally only, is usually installed on a common client, and needs to run in coordination with a server side. After development of the Internet, a more commonly used user side includes a web page browser used in the World Wide Web, an email client for receiving and sending emails, instant messaging client software, and the like. For such an application program, a corresponding server and service program in the network need to provide corresponding services, for example, a database service, or an email service. In this way, a specified communication connection needs to be established between the client and the server side, to ensure normal operation of the application program.

WEB server: usually refers to a website server, and is a program that camps on a certain type of computer on the Internet. The web server may provide a file for a client such as a browser, or may place a website file, for browsing by people all over the world, or may place a data file, for downloading by people all over the world.

FIG. 1 shows an embodiment of a client connection method in the embodiments of the present disclosure. The method is applied to a client connection system. The client connection system includes a first client, a second client, and a client connection server. The method includes the following steps:

S101. The first client determines a sharing identifier according to a link for binding of a client, where the link includes a first identification code of the first client and service type information, the first identification code is used for identifying the first client, the service type information represents a service type, and there is a correspondence between the service type information and the client connection server.

The first client generates a sharing identifier by using a link for a binding connection of a client. The sharing identifier may be parsed by using a scanning function of a second client. The link may be a URL website. The link needs to include the service type information and the first identification code corresponding to the first client. The first identification code herein may be a GUID. The client connection server may determine the first client according to the first identification code. The service type information may be an access address of a website on which a binding operation of the client is completed. The service type information represents a service type. The service type may represent a function implemented by a corresponding website. For example, if news browsing may be implemented on a website, a service type of the website may be referred to as new browsing. If video viewing may be implemented on a website, a service type of the website may be referred to as video viewing. Client connection may be implemented on a website used in embodiments of this application, a service type of the website is client connection. There is a correspondence between the service type information and the client connection server. The client connection server may be determined according to the service type information. This should be understood by a person of ordinary skill in the art, and details are not described herein again.

Both the first client and the second client herein may be WEB browsers, and the client connection server may be a WEB server. The first client may be installed on a computer, and the second client is installed on a mobile terminal. The sharing identifier may be a two-dimensional code. A link for implementing a binding connection of a client is used to generate a two-dimensional code. The two-dimensional code is scanned by using a camera of the mobile terminal on which the second client is installed, and then the link may be parsed out. Subsequently, the second client is used to log in to the website of the link. This is not specifically limited.

S102. The second client obtains the link from the sharing identifier, obtains the first identification code and the service type information according to the link, determines the client connection server according to the service type information, and sends a connection request carrying the first identification code and a second identification code to the client connection server, where the second identification code is used for identifying the second client.

The second client may obtain the link from the sharing identifier by using a photo shooting and scanning function of the second client. For example, when the second client is installed on the mobile terminal, a camera and a two-dimensional code parsing function of the mobile terminal may be used to identify information included in the two-dimensional code. An objective of obtaining, by means of parsing, the first identification code and the service type information that are included in the link, to obtain the sharing identifier shared by the first client is to establish a binding connection between the two clients. The second client encodes the second identification code of the second client and the first identification code of the first client, and sends the connection request including the code to the client connection server. It should be noted that the connection request may further include a work type for indicating a request objective, a name corresponding to the first client, a name of the second client, or the like. This is not specifically limited.

S103. The client connection server obtains the first identification code and the second identification code from the connection request, and establishes a binding connection between the first client and the second client according to the first identification code and the second identification code.

The client connection server may decode the code in the received connection request, to obtain the first identification code and the second identification code. The client connection server may determine the first client according to the first identification code, and determine the second client according to the second identification code. The client connection server caches binding data of the first client and the second client. In this way, a binding operation between the first client and the second client can be completed. After the binding operation is completed, resource sharing and transmission may be performed between the first client and the second client, for example, photo sharing, video sharing, or text sharing may be performed. This should be understood by a person of ordinary skill in the art, and details are not described again.

S104. The second client receives a binding success response returned by the client connection server, and adds a name of the first client to a second client binding list of the second client.

After the first client is successfully bound to the second client, the client connection server feeds back a message to the second client, and specifically, returns a binding success response to the second client. The binding success response may include a name of the first client and/or the first identification code, or the like. The second client may add the name of the first client to the second client binding list according to the received binding success response. The second client binding list is used for presenting details of a client connected to the second client.

S105. The first client receives real-time binding change information fed back by the client connection server, where the information includes a name of the second client and the second identification code, and adds the name of the second client to a first client binding list of the first client.

After the first client is successfully bound to the second client, the client connection server sends real-time binding change information to the first client. The real-time binding change information may include a name of the second client and/or the first identification code, or the like. It may be understood that the first client does not directly send a connection request to the client connection server. In this case, the first client passively receives a real-time binding change request sent by the client connection server. The first client adds the name of the second client to the first client binding list according to the real-time binding change information. The first client may obtain, by using the first client binding list, details of a client for which a binding connection is established. This should be understood by a person of ordinary skill in the art, and details are not described again.

It should be noted that in some embodiments, steps S104 and S105 may be performed in a reversed order. This is not specifically limited.

In some embodiments, the second client may display a binding information icon or an information sharing icon on a graphical user interface of the second client. When the binding information icon or the information sharing icon is selected, the second client may display a client binding user interface (UI). The client binding UI may list device names or identification codes corresponding to bound clients from the second client binding list. The client binding UI may further display the bound clients in two categories, the first category being client(s) bound based on a same user account logged in to the second client, the second category being client(s) bound based on the graphic code. The client binding UI may further nest and display the bound clients of the first category under an account number or account name of the user account, and nest and display the bound clients of the second category under temporary devices. The client binding UI may further provide options to add a binding client under the two categories. When the option of adding a binding client under the first category is selected, the second client requests the client connection server to check whether another client is logged in on the same user account; and if there is a client logged in on the same user account, adds a client to the second client binding list based on information returned from the client connection server. When the option of adding a binding client under the second category is selected, the second client generates a second sharing identifier according to a second link which includes the second identification code and the service type information, so that a third client can scan the second sharing identifier to bind with the second client. In addition, when a bound client on the client binding UI is selected, the second client may be configured to exchange information between the second client and the selected bound client based on user input, such as sharing local information with the bound client, browsing remote information on the bound client, etc. It can be understood that the first client can include a client binding UI that functions similarly as the above-described client binding UI on the second client.

In solutions of embodiments of the present disclosure, a first client needs to share, with a second client, only a sharing identifier associated with a client, the second client sends a connection request to a client server according to content of the sharing identifier, and a client connection server binds the first client and the second client together according to the connection request, so that a user does not need to completes a binding and connection operation by using a same account number on the two clients, thereby implement fast connection between the two clients, improving utilization of functions of a client, and improving user experience.

Figure 2:
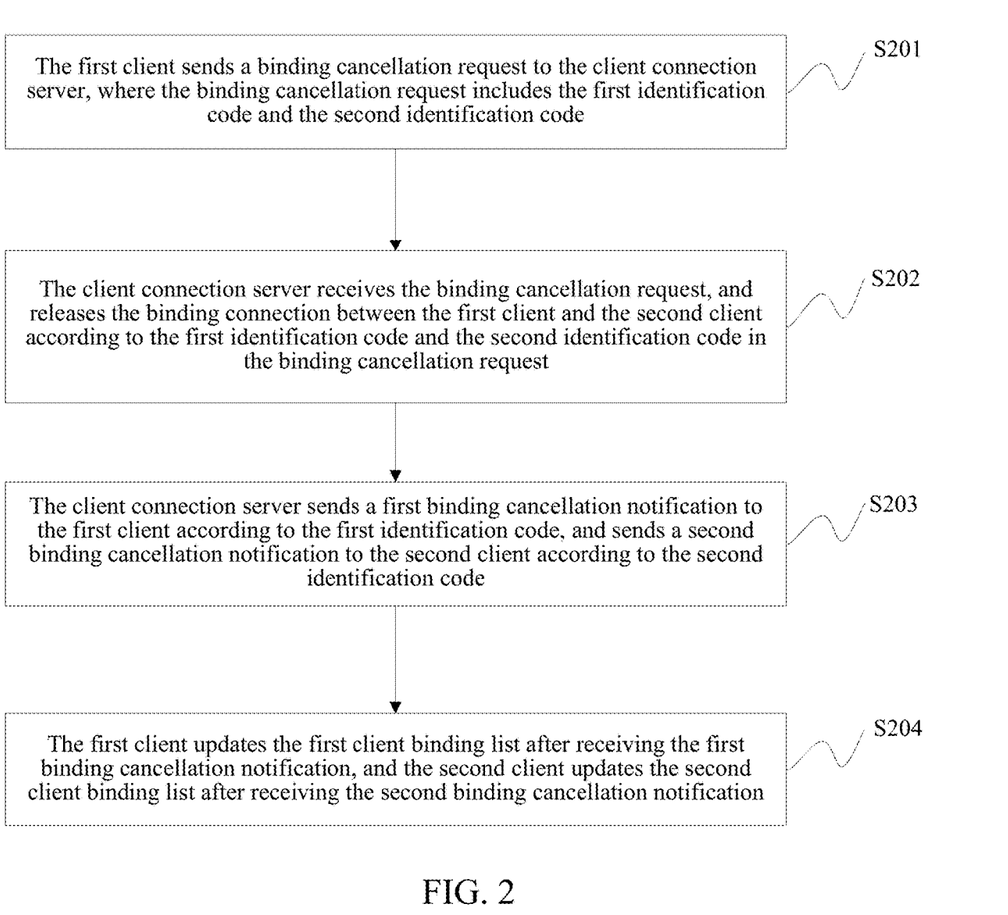
FIG. 2 is a flowchart of another embodiment of a client connection method according to the embodiments of the present disclosure.

Referring to FIG. 2, in the embodiments of the present disclosure, after a binding connection relationship is established between two clients, the embodiments of the present disclosure further provide an embodiment of removing a binding relationship between two between clients. Descriptions are provided below.

In an example, the first client initiates unbinding.

S201. The first client sends a binding cancellation request to the client connection server, where the binding cancellation request includes the first identification code and the second identification code.

Because there is much binding information cached on the client connection server, when the first client initiates unbinding, the first identification code and the second identification code need to be added to the binding cancellation request. Certainly, the name of the first client and the name of the second client may also be added. The client connection server may parse the names to obtain the corresponding identification codes. Certainly, the binding cancellation request may further carry an identifier used for identifying a work type as unbinding. This is not specifically limited. During unbinding, a button such as "disconnect" on the first client may be triggered, so as to send a binding cancellation request to a client server. A name of the button may be flexibly set as needed. This is not specifically limited. In some embodiments, the disconnection button is displayed on a side of a device name or identifier corresponding the second client on the client binding UI of the first client. In one embodiment, both the first client and the second client are configured to present the disconnection button for unbinding with each other. In another embodiment, only the client that generates the sharing identifier (e.g., the first client in this example) is allowed to display the disconnection button.

S202. The client connection server receives the binding cancellation request, and releases the binding connection between the first client and the second client according to the first identification code and the second identification code in the binding cancellation request.

The client connection server may obtain the first identification code and the second identification code according to the received binding cancellation request, and may find cached binding information corresponding to binding between the first client and the second client. The client connection server may complete an operation of unbinding the first client from the second client by eliminating the corresponding cached binding information.

S203. The client connection server sends a first binding cancellation notification to the first client according to the first identification code, and sends a second binding cancellation notification to the second client according to the second identification code.

After eliminating the cached binding information of the first client and the second client, the client connection server sends a binding cancellation notification to each of the first client and the second client, so that the first client and the second client update their respective client binding lists (e.g., and also update their respective client binding UI). The binding cancellation notification includes the first identification code and/or the second identification code.

S204. The first client updates the first client binding list after receiving the first binding cancellation notification, and the second client updates the second client binding list after receiving the second binding cancellation notification.

For ease of understanding of a client connection method in embodiments of the present disclosure, the following provides an application scenario for description.

The first client encodes a URL http://sc.qq.com/fx/qr?guid=%s to generate a two-dimensional code, where a parameter of guid=%s is filled with a GUID of the first client. The GUID is allocated by a background to the client, and uniqueness of the GUID is ensured.

The second client scans, by using a scanning function, the two-dimensional code generated by the first client, and parses the two-dimensional code to obtain data: http://sc.qq.com/fx/qr?guid=%s.

The second client determines, according to the front part http://sc.qq.com/fx/qr of the URL, that this is a client connection operation, and further extracts the GUID of the first client.

The second client encodes a GUID and other information of the second client and the identified GUID of the first client, and sends an encoded request to the client connection server by means of HTTP. Examples of the sent information are shown in Table 1:

TABLE 1

```
struct SetBindInfoReq
{
    0 optional CoinmUserBase    stub;         //User basic
                                              information
    1 optional EBindAction      eAction;      //Set action type
    2 optional EBindMode        eMode;        //Binding mode
    3 optional string           sGroupId;     //Binding relationship
                                              content
    4 optional string           sGroupName;   //Binding relationship
                                              name
    5 optional string           sDeviceName;  //Device name
};
```

After receiving the request, the client connection server caches binding data of the first client and the second client, replies the second client with a binding success message, and sends a real-time binding change message to the first client. The message includes the name and/or the GUID of the second client or the like.

After receiving the binding success message returned by the client connection server, the second client pulls a client binding list from the client connection server again. In this case, the list includes the first client.

After being bound, the first client passively receives a binding notification. The message includes the information about the second client. In this case, the first client adds the information about the second client to the client binding list of the first client.

Figure 3:
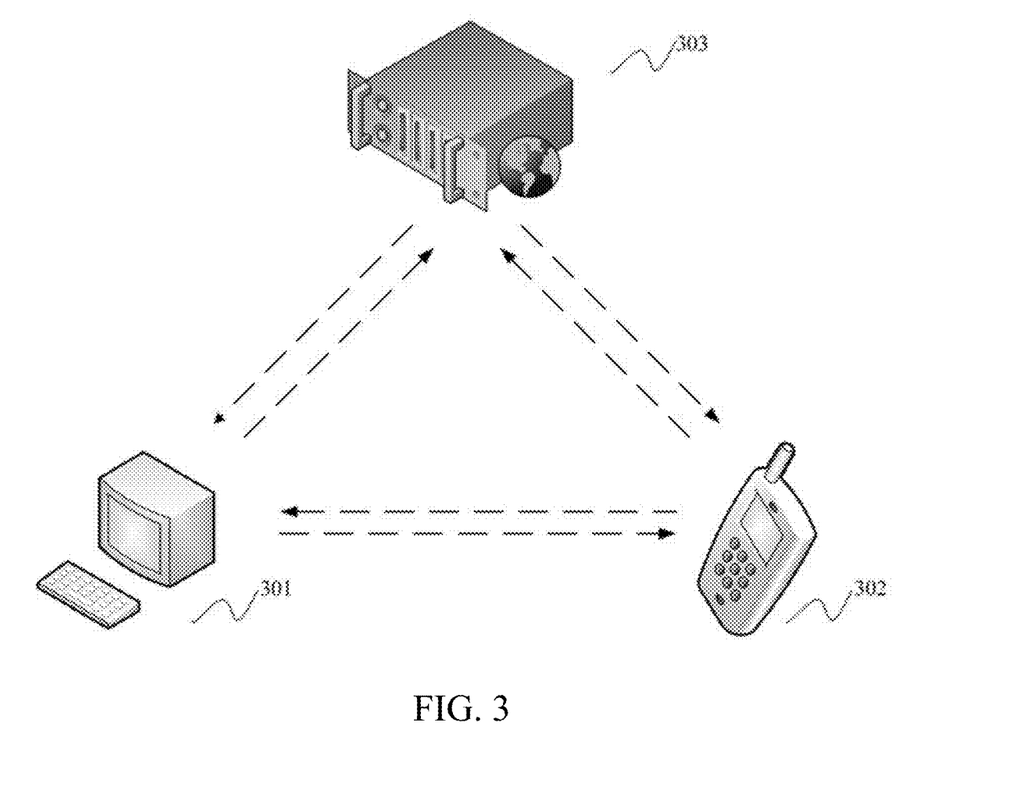
FIG. 3 is a structural diagram of an embodiment of a client connection system according to the embodiments of the present disclosure.

Referring to FIG. 3, the present disclosure describes a client connection method above. Correspondingly, an embodiment of the present disclosure further provides a client connection system. The system including a first client 301, a second client 302, and a client connection server 303.

The first client 301 is configured to determine a sharing identifier according to a link for binding of a client, where the link includes a first identification code of the first client 301 and service type information, and there is a correspondence between the service type information and the client connection server 303.

The second client 302 is configured to: obtain the link from the two-dimensional code, obtain the first identification code and the service type information according to the link, determine the client connection server 303 according to the service type information, and send a connection request carrying the first identification code and a second identification code to the client connection server 303, where the second identification code is used for identifying the second client 302.

The client connection server 303 is configured to: obtain the first identification code and the second identification code from the connection request, and establish a binding connection between the first client 301 and the second client 302 according to the first identification code and the second identification code, where the first identification code and the second identification code are both unique.

Optionally, the second client 302 is further configured to receive a binding success response returned by the client connection server.

The second client 302 is further configured to add a name of the first client 301 to a second client binding list of the second client 302.

Optionally, the first client 301 is further configured to receive real-time binding change information fed back by the client connection server 303, where the information includes a name of the second client 302 and the second identification code.

The first client 301 is further configured to add a name of the second client 302 to a first client binding list of the first client 301.

Optionally, the first client 301 is further configured to send a binding cancellation request to the client connection server 303, where the binding cancellation request includes the first identification code and the second identification code.

The client connection server 303 is further configured to: receive the binding cancellation request, and release the binding connection between the first client 301 and the second client 302 according to the first identification code and the second identification code in the binding cancellation request.

Optionally, the client connection server 303 is further configured to: send a first binding cancellation notification to the first client 301 according to the first identification code, and send a second binding cancellation notification to the second client 302 according to the second identification code.

The first client 301 is further configured to update the first client binding list after receiving the first binding cancellation notification.

The second client 302 is further configured to update the second client binding list after receiving the second binding cancellation notification.

The first client 301 is located in a computer, and the second client 302 is located in a mobile terminal.

The first client 301 and the second client 302 are both WEB browsers, and the client connection server is a WEB server.

Figure 4:
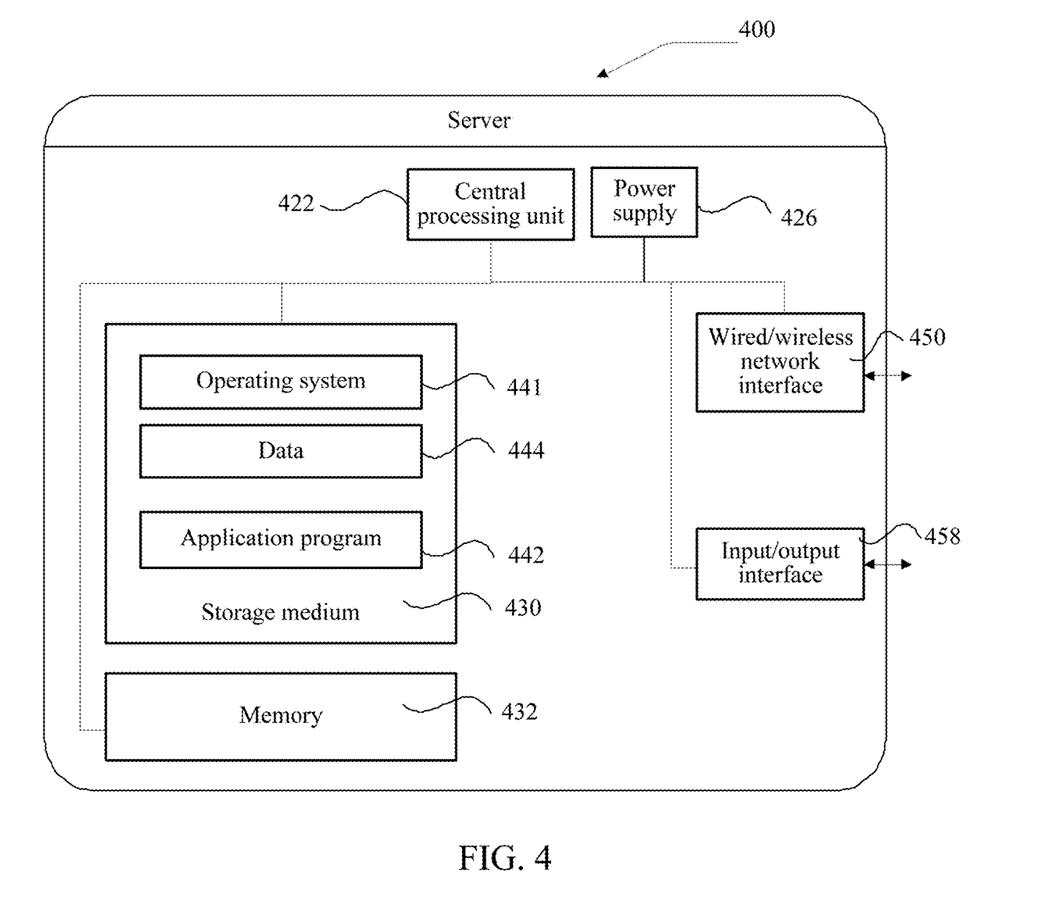
FIG. 4 is a structural diagram of an embodiment of a client connection server according to the embodiments of the present disclosure.

FIG. 4 is a schematic structural diagram of a client connection server according to an embodiment of the present disclosure. The server 400 may vary greatly due to different configurations or performance, and may include one or more central processing units (CPU) 422 (for example, one or more processors), one or more memories 432, and one or more storage mediums 430 (for example, one or more mass storage devices) for storing an application program 442 or data 444. The memory 432 and the storage medium 430 may be transient or persistent storages. A program stored in the storage medium 430 may include one or more modules (not shown in the figure), and each module may include a series of instructions and operations for the server. Still further, the CPU 422 may be configured to communicate with the storage medium 430, and perform, on the server 400, a series of instructions and operations in the storage medium 430.

The server 400 may further include one or more power supplies 426, one or more wired or wireless network interfaces 450, one or more input/output interfaces 458, and/or one or more operating systems 441, for example, Windows Server™, Mac OS X™, Unix™, Linux™, or FreeBSD™.

The steps performed by the server in the foregoing embodiments may be based on the server structure shown in FIG. FIG. 4.

Figure 5:
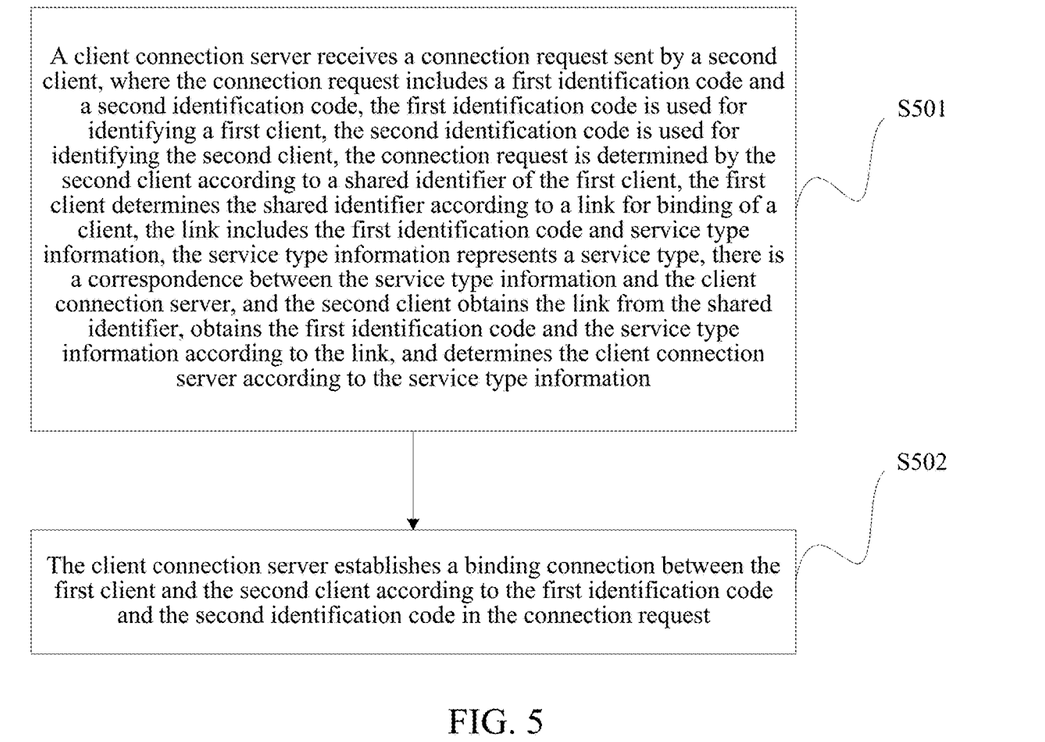
FIG. 5 is a flowchart of an embodiment of a client connection method according to the embodiments of the present disclosure.

Referring to FIG. 5, a client connection server is used as an execution body, an embodiment of the present disclosure further provides a client connection method. The method is applied to a client connection system. The client connection system includes a first client, a second client, and a client connection server. The method includes the following steps:

S501. The client connection server receives a connection request sent by the second client, where the connection request includes a first identification code and a second identification code, the first identification code is used for identifying the first client, the second identification code is used for identifying the second client, the connection request is determined by the second client according to a sharing identifier of the first client, the first client determines the sharing identifier according to a link for binding of a client, the link includes the first identification code and service type information, there is a correspondence between the service type information and the client connection server, and the second client obtains the link from the sharing identifier, obtains the first identification code and the service type information according to the link, and determines the client connection server according to the service type information.

Content of step S501 is similar to content of step S101 and S102 above, and details are not described herein again.

S502. The client connection server establishes a binding connection between the first client and the second client according to the first identification code and the second identification code in the connection request.

Content of step S502 is similar to content of step S103, and details are not described herein again.

Optionally, the method further includes:
returning, by the client connection server, a binding success response to the second client, so that the second client adds a name of the first client to a second client binding list of the second client.

Optionally, the method further includes:
returning, by the client connection server, real-time binding change information to the first client, where the information includes a name of the second client and the second identification code, so that the first client adds the name of the second client to a first client binding list of the first client.

Optionally, the method further includes:
receiving, by the client connection server, a binding cancellation request sent by the first client, where the binding cancellation request includes the first identification code and the second identification code; and
releasing, by the client connection server, the binding connection between the first client and the second client according to the first identification code and the second identification code in the binding cancellation request.

Optionally, after the releasing, by the client connection server, the binding connection between the first client and the second client according to the first identification code and the second identification code in the binding cancellation request, the method further includes:
sending, by the client connection server, a first binding cancellation notification to the first client according to the first identification code, so that the first client updates the first client binding list after receiving the first binding cancellation notification; and
sending, by the client connection server, a second binding cancellation notification to the second client according to the second identification code, so that the second client updates the second client binding list after receiving the second binding cancellation notification.

In solutions of embodiments of the present disclosure, a first client needs to share, with a second client, only a sharing identifier associated with a client, the second client sends a connection request to a client server according to content of the sharing identifier, and a client connection server binds the first client and the second client together according to the connection request, so that a user does not need to completes a binding and connection operation by using a same account number on the two clients, thereby implement fast connection between the two clients, improving utilization of functions of a client, and improving user experience.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

A person of ordinary skill in the art may understand that all or some of the steps of the methods in the embodiments may be implemented by a program instructing relevant hardware. The program may be stored in a computer readable storage medium, and the storage medium may include a read-only memory (ROM), a random access memory (RAM), a magnetic disk, an optical disk, and the like.

A person of ordinary skill in the art may understand that all or some of the steps of the method according to the foregoing embodiments may be implemented by a program instructing relevant hardware. The program may be stored in a computer readable storage medium, and the storage medium may be a read-only memory, a magnetic disk, an optical disc, or the like.

The client connection method and system provided in the present disclosure are described in detail above. A person of ordinary skill in the art may make modifications to the specific implementations and application scopes according to the ideas of the embodiments of the present disclosure. In conclusion, content of this specification should not be construed as a limitation to the present disclosure.

What is claimed is:

1. A client connection method, comprising:
   obtaining, by a second client, a first link from a sharing identifier generated by a first client, the sharing identifier being a graphic code captured by the second client without using user credentials, the first link comprising a first identification code and service type information, the first identification code being used for identifying the first client, the service type information representing a service type corresponding to a client connection server;

extracting, by the second client, the first identification code and the service type information according to the first link;

determining, by the second client, the client connection server according to the service type information;

sending, by the second client, a connection request carrying the first identification code and a second identification code to the client connection server, the second identification code being used for identifying the second client, wherein the connection request sent by the second client to the client connection server does not include the first link; and connecting with the first client based on a binding connection between the first client and the second client established by the client connection server according to the first identification code and the second identification code.

2. The method according to claim 1, wherein the method further comprises:
   receiving, by the second client, a binding success response returned by the client connection server; and
   adding, by the second client, a name of the first client to a second client binding list of the second client.

3. The method according to claim 2, wherein the method further comprises:
   sending, by the second client, a binding cancellation request to the client connection server, wherein the binding cancellation request comprises the first identification code and the second identification code; and
   releasing the binding connection with the first client.

4. The method according to claim 2, wherein the method further comprises:
   receiving, by the second client from the client connection server, a binding cancellation notification, the binding cancellation notification includes the first identification code; and
   updating, by the second client, the second client binding list after receiving the binding cancellation notification by removing the first client from the second client binding list.

5. The method according to claim 2, further comprising:
   displaying, by the second client in a client binding user interface, one or more bound clients from the second client binding list in two categories, the first category including a device bound with the second client based on a same user account logged in to the second client, the second category including the name of the first client bound with the second client based on the graphic code.

6. The method according to claim 1, wherein the service type information is a uniform resource locator (URL) website, the URL website is used for indicating an access website of the client connection server, the sharing identifier is a two-dimensional code, and the first identification code and the second identification code are both globally unique identifiers (GUID).

7. The method according to claim 1, wherein the method further comprises:
   generating, by the second client, a second sharing identifier according to a second link for binding a client, the second link comprising the second identification code and the service type information; and
   presenting, by the second client, the second sharing identifier, wherein the second sharing identifier is a two-dimensional code.

8. The method according to claim 7, wherein the method further comprises:

receiving, by the second client, real-time binding change information returned from the client connection server, wherein the binding change information comprises a name of a third client and a third identification code; and adding, by the second client, the name of the third client to the second client binding list.

9. A non-transitory computer-readable medium storing computer-executable program that, when being executed by a processor, causes the processor to perform:

obtaining, by a second client, a first link from a sharing identifier generated by a first client, the sharing identifier being a graphic code captured by the second client without using user credentials, the first link comprising a first identification code and service type information, the first identification code being used for identifying the first client, the service type information representing a service type corresponding to a client connection server;

extracting, by the second client, the first identification code and the service type information according to the first link;

determining, by the second client, the client connection server according to the service type information;

sending, by the second client, a connection request carrying the first identification code and a second identification code to the client connection server, the second identification code being used for identifying the second client, wherein the connection request sent by the second client to the client connection server does not include the first link; and connecting with the first client based on a binding connection between the first client and the second client established by the client connection server according to the first identification code and the second identification code.

10. The storage medium according to claim 9, wherein the computer-executable program further causes the processor to perform:

receiving, by the second client, a binding success response returned by the client connection server; and adding, by the second client, a name of the first client to a second client binding list of the second client.

11. The storage medium according to claim 10, wherein the computer-executable program further causes the processor to perform:

sending, by the second client, a binding cancellation request to the client connection server, wherein the binding cancellation request comprises the first identification code and the second identification code; and releasing the binding connection with the first client.

12. The storage medium according to claim 10, wherein the computer-executable program further causes the processor to perform:

receiving, by the second client from the client connection server, a binding cancellation notification, the binding cancellation notification includes the first identification code; and updating, by the second client, the second client binding list after receiving the binding cancellation notification by removing the first client from the second client binding list.

13. The storage medium according to claim 10, further comprising:

displaying, by the second client in a client binding user interface, one or more bound clients from the second client binding list in two categories, the first category including a device bound with the second client based on a same user account logged in to the second client, the second category including the name of the first client bound with the second client based on the graphic code.

14. The storage medium according to claim 9, wherein the service type information is a uniform resource locator (URL) website, the URL website is used for indicating an access website of the client connection server, the sharing identifier is a two-dimensional code, and the first identification code and the second identification code are both globally unique identifiers (GUID).

15. The storage medium according to claim 9, wherein the computer-executable program further causes the processor to perform:

generating, by the second client, a second shared identifier according to a second link for binding of a client, the second link comprising the second identification code and the service type information;

receiving, by the second client, real-time binding change information returned from the client connection server, wherein the binding change information comprises a name of a third client and a third identification code; and adding, by the second client, the name of the third client to the second client binding list.

16. A computing device, comprising:

a memory storing computer instructions; and a processor executing the computer instructions to perform:

obtaining a first link from a sharing identifier generated by a first client, the sharing identifier being a graphic code captured by a second client without using user credentials, the first link comprising a first identification code and service type information, the first identification code being used for identifying the first client, the service type information representing a service type corresponding to a client connection server, and the second client being executed by the computing device;

extracting the first identification code and the service type information according to the first link;

determining the client connection server according to the service type information;

sending a connection request carrying the first identification code and a second identification code to the client connection server, the second identification code being used for identifying the second client, wherein the connection request sent by the second client to the client connection server does not include the first link; and connecting with the first client based on a binding connection between the first client and the second client established by the client connection server according to the first identification code and the second identification code.

17. The device according to claim 16, wherein the processor is further configured to perform:

receiving a binding success response returned by the client connection server; and adding a name of the first client to a second client binding list of the second client.

18. The device according to claim 17, wherein the processor is further configured to perform:
  sending a binding cancellation request to the client connection server, wherein the binding cancellation request comprises the first identification code and the second identification code; and
  releasing the binding connection with the first client.

19. The device according to claim 17, wherein the processor is further configured to perform:
  receiving, from the client connection server, a binding cancellation notification, the binding cancellation notification includes the first identification code; and
  updating the second client binding list after receiving the binding cancellation notification by removing the first client from the second client binding list.

* * * * *